United States Patent Office 3,350,292
Patented Oct. 31, 1967

3,350,292
UTILIZATION OF SALINE WATER
Arthur Joseph Weinberger, Stamford, and Darwin Fiske De Lapp, New Canaan, Conn., assignors, by direct and mesne assignments, of one-half to American Cyanamid Company, Stamford, Conn., a corporation of Maine, and one-half to the United States of America as represented by the Secretary of the Interior
Filed May 14, 1964, Ser. No. 367,428
11 Claims. (Cl. 204—180)

ABSTRACT OF THE DISCLOSURE

Sea water is converted to potable form, and chemicals recovered, by adding a soluble alkali such as sodium hydroxide to convert bicarbonate to carbonate, and sodium carbonate to precipitate calcium, the precipitates removed; magnesium separately separated by (1) cation exchange resins, using recycled sodium chloride to regenerate, or (2) adding sodium hydroxide and separating magnesium hydroxide; then acidifying, converting the descaled sea water to potable water and a saline concentrate, and recovering salt or sodium hydroxide for recycle from the saline concentrate, and recovering bromine if desired.

---

This invention resulted from work done under a contract with the Office of Saline Water in the Department of the Interior entered into pursuant to the Saline Water Act, 42 U.S.C. 1951–1958g.

This invention relates to processes for rendering saline waters potable and simultaneously recovering in commercially usable form at least part of the mineral content of the water. Primarily, the invention is for the recovery from sea water of potable water primarily for drinking and domestic purposes, although also completely satisfactory for industrial and irrigation purposes. The hardness, i.e., the $Ca^{++}$ and $Mg^{++}$, in the water is minimized to prevent or reduce scale formation utilizing low cost chemicals, which preferably at least in part are regenerated in the process to secure water sufficiently free from scale forming components that the water may be used in evaporators, and after concentration of the mineral content, at least part of the mineral content is recovered, the recovered values being used in the process, or sold as such, or transformed to industrially saleable materials.

In the past sea water has been distilled to yield potable water using a single effect or multiple effect evaporator or a multistage flash evaporator and at times generated steam has been compressed to raise the temperature so that the compressed steam could be used in part as the heating medium. Such compressive distillation procedures are particularly useful where power is available at a low figure.

In such distillation procedures the natural hardness of sea water has caused scaling of equipment, thus reducing capacity and increasing costs due to both the low heat transfer coefficient and the cost of maintaining the equipment.

Also, in the past, efforts have been made to recover commercially useful values from sea water. These have varied from schemes ranging from the exotic for recovering gold, to commercially useful processes for recovering magnesium, sodium chloride, or bromine. As illustrative of such prior art, U.S. Patent 2,764,472, W. R. Cady et al., "Brine Purification," Sept. 25, 1956, discloses a method for producing substantially pure sodium chloride crystals. U.S. Patent 2,772,143, W. F. McIlhenny et al., "Method of Recovering Magnesium Salts From Sea Water," Nov. 27, 1956, discloses a method for producing a magnesium salt from sea water in which the sea water is diluted with fresh water and the magnesium separated by an ion exchange resin. In this patent there is a disclosure of adding sodium carbonate and sodium hydroxide to precipitate calcium carbonate and the effluent is fed to the ion exchange resin beds. U.S. Patent 2,934,419, V. Cook, "Method of Treating Sea Water," April 26, 1960, discloses the recovery of trace minerals from sea water by adding sodium hydroxide and sodium carbonate to precipitate calcium and magnesium, on the surface of which precipitate particles are concentrated trace elements.

U.S. Patent 3,128,248, Suzuki, "Method For The Purification of Brine," April 7, 1964, shows the use of sodium hydroxide and lime or sodium carbonate to separate magnesium and calcium from brine and sea water, using as coagulant oil, soap or polyelectrolyte, with pressurizing of the system under air, thus forming, on release from pressure, fine air bubbles which give a more rapid flotation of the precipitated calcium carbonate and magnesium hydroxide.

Since the times of the Phoenicians, or earlier, sea water has been evaporated to yield sodium chloride as table salt—sometimes of questionable purity.

In each of these processes a single objective is controlled.

We have now discovered a system whereby the sea water can be treated to yield potable water and mineral values concurrently; thus reducing the cost because part of the cost is borne by the value of the potable water and part of the cost is borne by the recovered chemicals.

It has now been found that sea water can be descaled using chemicals obtained at least in part from the treated sea water so that a comparatively scale-free feed is obtained, thus permitting higher efficiency in the evaporator or other physical recovery process, and higher concentration of the effluent, which effluent is used as a source of chemicals. Both the chemicals and the potable water are regarded as saleable products; although the chemicals alone may be the primary product. The demand and transportation costs determine the economics in a particular location and determine which should be regarded as product and which should be regarded as by-product.

The value of the chemicals produced and the cost of raw materials for the process varies with location. The material required in the largest quantity which is not yielded by the process is lime. The lime can, of course, be recovered by burning calcium carbonate, if a more economical source is not available. Similarly, even though the process is designed primarily using sodium hydroxide and sulfuric acid for pH control, and sodium chloride for ion resin exchange regeneration, there are times and places where the economics are warped by having the process streams from adjacent chemical plants which have useful constituents at distress prices. For example, if an acid such as hydrochloric acid or phosphoric acid, or a gaseous alkali such as ammonia or lithium hydroxide or potassium hydroxide is available where for peculiar local reasons the economic value is very low, such components can be introduced into the system. Lithium hydroxide or lithium carbonate or potassium hydroxide or potassium carbonate theoretically could be used but in any normal economic pattern are non-competitively priced. Similarly, ammonia could be used for pH control or introduced as ammonium carbonate with ammonia being recovered later in the process by treatment with lime. Such variations can be adjusted into the process with minor modifications in the presence of unusual economic considerations.

The present process cannot be economically practiced on a small scale because the cost of labor would be proportionately too high. Where a major plant investment can be made to yield several million gallons of water per day, the process becomes economically more attractive. The process can become even more attractive where major quantities of heat are available from a process as, for example, a nuclear generating station or a large power plant, which makes heat available at a lower proportionate cost. Waste heat from plant processes is particularly attractive for distillation operations.

Although the preliminary treatment can conveniently be at room temperature, it is frequently advantageous to warm the feed water to increase the speed of reaction, give a more readily filterable product, and reduce the viscosity during processing. Such heat is not wasted as the treated feed to later distillation would be of the water already heated, and the heat would be conserved. Such variations are, of course, within the scope of the present invention and in part depend on local economic factors, including climatic conditions, at any particular plant.

As used in this application, sea water refers essentially to the saline water that exists in the open sea, although it includes the same sea water, somewhat concentrated by partial evaporation in inland areas, such as the Red Sea, or as diluted by dumping minor quantities of chemicals or fresh water or sewage, as from rivers, to give a somewhat more dilute sea water, and sea water as diluted by melting ice as it exists in the polar regions. Although the chemical analysis of the sea water may vary somewhat in various areas of the world, the present process may be used successfully with any such sea water as feed. The feed is, of course, filtered or settled to remove seaweed or other solid particles, including fish, before use.

Potable water is used to refer to water of a low solids concentration suitable for drinking or domestic purposes, such as the ordinary household uses, including washing the baby, washing clothes, dishes and other household chores. It is also satisfactory for the irrigation of crops, lawns, other agricultural uses and industrial uses, including boiler feed water, chemical processes, including plating baths, steel mills, cement mills, and ore processing. Usually the industrial and agricultural uses require a lower first cost so economics become important. The economics in each area must be considered as competitive sources and availability and purity affect the economic advisability of installing a plant for recovering potable water and chemical by-products from sea water. In some areas of the world, and even of the United States, the demond for potable water is already at the point that production from sea water is economically advantageous on a major scale. In other areas, potable water in streams and rivers is in such large supply that sea water treatment is definitely out of the question for the near future.

By physical conversion is meant the physical process of separating water from dissolved salts and includes the various forms of distillation, freezing, dialysis, reverse osmosis, and hydrate formation.

Figure 1:
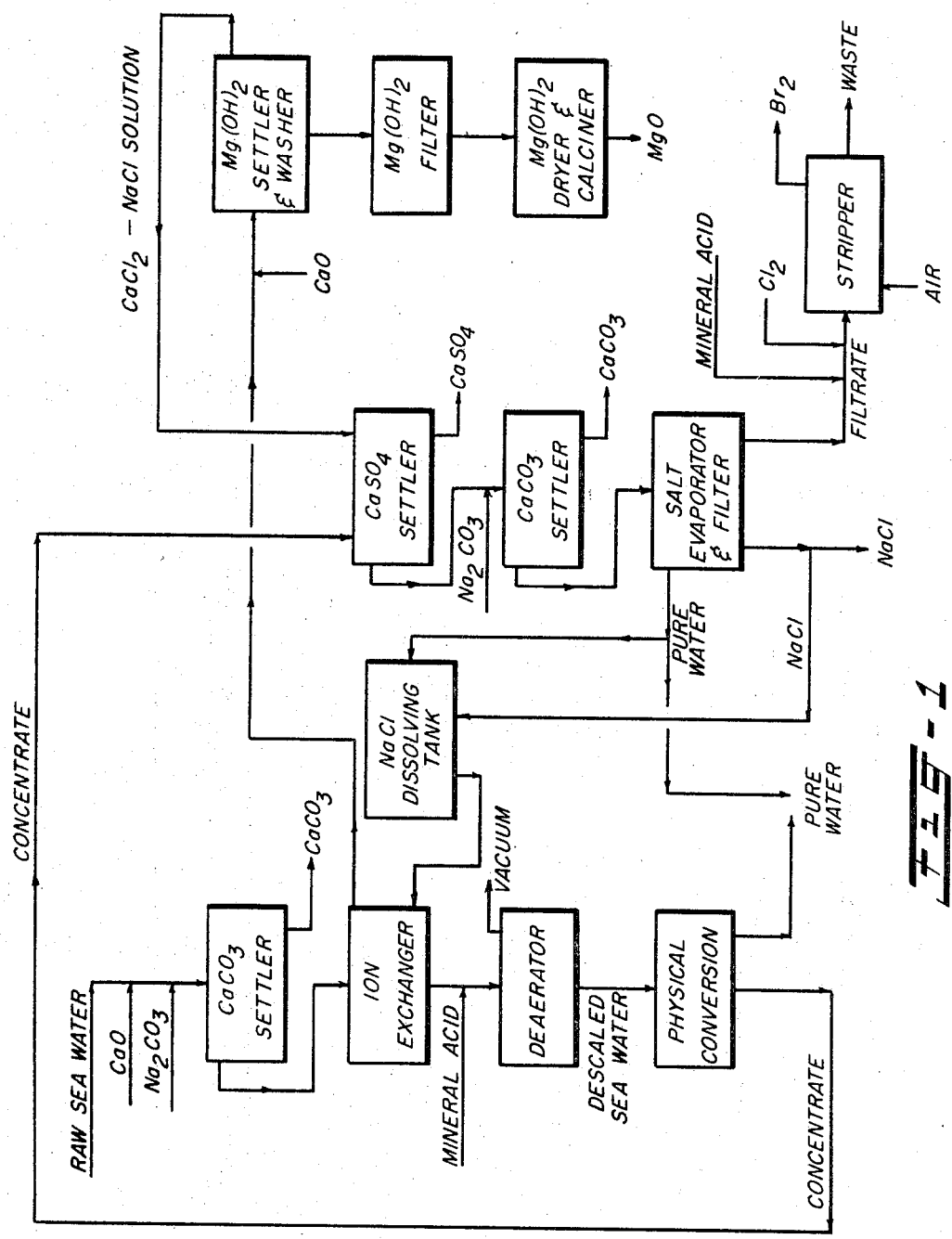
FIGURE 1 is a flow sheet showing ion exchange separation of magnesium.

In accordance with one modification of the present invention, saline water after preliminary screening to remove gross contaminants, is treated in any order with sodium hydroxide or lime and sodium carbonate to convert bicarbonate ions to carbonate ions and to precipitate calcium carbonate. The clarified solution is mixed with more sodium hydroxide to precipitate magnesium hydroxide which is thickened and either dried and calcined to yield magnesia as a product, or reacted with hydrochloric acid to convert it to magnesium chloride. The sea water, virtually free from calcium and magnesium, is fed to a distillation unit for the recovery of potable water from the overhead and the concentrated saline effluent is further concentrated to yield crystalline sodium chloride, at least part of which is electrolyzed to produce sodium hydroxide and chlorine. As an alternate, the concentrated brine may be treated with lime to precipitate calcium sulfate, then sodium carbonate to precipitate excess calcium, then partly electrolyzed to yield gaseous chlorine (collected as a product) and a sodium hydroxide solution containing some salt. A portion of this latter is treated with carbon dioxide gas (furnace stack gas flow in sulfur can be used) and recycled to the steps requiring sodium carbonate, Some of the sodium hydroxide is used as required in the treatment process, and any remainder sold. Part of the chlorine may be used to release bromine from the concentrated brine to obtain product bromine.

Conveniently, alternatively, the sea water is treated with lime (calcium hydroxide) and soda ash (sodium carbonate) to precipitate out calcium carbonate. The calcium carbonate sludge can go to waste or be recovered if sufficient demand exists. After the carbonate is settled, the remaining solution is passed through a series of ion exchangers which pick up magnesium and any residual calcium ions. The softened water is fed to an evaporation unit. The effluent from the evaporation unit is evaporated further to obtain sodium chloride, preferably after sulfate removal.

The ion exchange resin is regenerated with concentrated sodium chloride, which is made up by dissolving a portion of the crystallized sodium chloride produced in part of the fresh water. Concentrated brine from the sea water evaporation contains too much sulfate to be used for regeneration, since calcium sulfate would precipitate with the magnesium hydroxide when lime is added. A mixture of the brine with sodium chloride dissolved in fresh water may be used, so long as the sulfate present is not sufficient to precipitate calcium sulfate. The rich regenerant from the ion exchanger contains the major part of the magnesium and some calcium and excess sodium, as the chlorides. This is mixed with additional lime yielding magnesium hydroxide which is settled and/or filtered, dried and calcined to magnesium oxide or, where desired, converted to magnesium chloride with hydrochloric acid and electrolyzed for the recovery of magnesium metal. A very pure product is obtained, and can often be sold at a premium price.

The overflow from magnesium hydroxide precipitation, containing substantial calcium and sodium chloride is mixed with the concentrate from the evaporator to yield calcium sulfate as a sludge and the supernatant solution is treated with sodium carbonate as required to separate excess calcium as calcium carbonate. If the maximum production of sodium chloride is not required, it is desirable to add only a portion of the overflow from magnesium hydroxide precipitation to the sea water concentrate, since the former contains more dissolved calcium than the equivalent of $SO_4$ in the latter. Other salts present in minor quantities can be separated out before or after the recovery of bromine if the economics at the location of operation justify recovery.

Obviously, the exact proportions used will vary depending upon the economics of a particular plant. The costs of heat and the economic value placed on purified water and the market potential of various chemicals produced will vary depending on freight, purities, and other economic considerations. Accordingly, the examples below are to be considered as illustrative only and the exact operating points for maximum economic recovery varies from plant to plant and time to time but in accordance with the general principles outlined herein. It is to be understood that quantities of sea water treated are comparatively large and minor changes in economic conditions vary the preferred control points in the process.

*Example 1*

As shown in FIGURE 1, sea water is treated with calcium oxide and sodium carbonate to precipitate calcium carbonate. The calcium oxide is added in sufficient quantity to convert substantially all of the bicarbonate in the sea water to carbonates and sufficient sodium carbonate is added to react with substantially all of the calcium then present. Only a small amount of the magnesium precipitates and the calcium carbonate which precipitates contains predominant portions of the heavy metal impurities such as aluminum and iron as their hydroxides. The calcium carbonate is settled or otherwise separated. The treated water is passed through several successive beds of ion exchange resins which absorb most of the magnesium and any residual calcium while releasing sodium to the solution. The water thus formed can be considered as descaled as it has a very small proportion of scale-forming constituents present.

Conveniently, and customarily, the pH is adjusted with a mineral acid. The acidification renders certain of the salts more soluble and permits deaeration and concentration. The descaled sea water is concentrated in an evaporator, specifically in this example a multiple effect evaporator, to yield product water which is substantially pure and a concentrate. Because the water has been descaled, it is convenient to concentrate about ten-fold until the sodium chloride in the water is near saturation, thus forming a concentrate. The ion exchange resin bed which is heavily loaded with magnesium and contains some calcium is regenerated by passing through the bed a concentrated solution, preferably saturated, or sodium chloride in fresh water. It is preferred to use a comparatively pure sodium chloride dissolved in pure water. If the brine concentrate itself were used the high concentration of sulfate ions would introduce complications.

The regenerant solution contains the magnesium and calcium primarily as a chloride with some sodium chloride and, in accordance with conventional practice, lime may be added either as calcium oxide or as a slurry of calcium hydroxide, which precipitates magnesium as the hydroxide; which is thickened, filtered and washed. It may be dried and calcined to give comparatively pure magnesia, or may be treated with hydrochloric acid to yield magnesium chloride for electrolysis to produce metallic magnesium or other purposes. The solution from which the magnesia has been precipitated, containing a mixture of sodium and calcium chlorides, is mixed with a concentrate from the water conversion unit, containing sulfates, precipitating calcium sulfate which may be heated and treated to form a desired grade of gypsum. The clarified liquid from the calcium sulfate precipitation is treated with sodium carbonate to precipitate residual calcium as the carbonate, which can be washed, dried and calcined for use in the magnesia precipitation, or elsewhere. The clarified low calcium brine is evaporated to yield pure water and comparatively pure sodium chloride. Preferably the sodium chloride is separated out before dryness is reached and before any other components precipitate, so that a filtrate is obtained containing bromides and most of the residual salts not earlier accounted for. Some of the sodium chloride and pure water obtained are used to prepare the brine for regenerating the ion exchange resin.

The concentrated brine effluent from salt evaporation is acidified with sulfuric acid, chlorinated to release free bromine from the dissolved bromides, then blown with air to displace the bromine as vapor. The bromine vapor is absorbed in sodium carbonate solution which is acidified and steamed in accordance with conventional practices to yield product bromine. After the bromine separation the brine is conveniently neutralized with sodium carbonate and discarded, although it may be discarded in the acid form.

As is obvious, certain modifications may be made, as for example, the lime may be added as a slurry of calcium hydroxide, or alkalinity can be introduced as sodium hydroxide which reduces the amount of calcium carbonate to be settled. The choice of the use of lime or sodium hydroxide depends upon the marketability and availability of these respective materials.

In the pH adjustment sulfuric acid is normally used as the cheapest of the mineral acids. However, if part of the product sodium chloride is electrolyzed to yield sodium hydroxide and chlorine, part of the chlorine may be converted to hydrochloric acid and the hydrochloric acid used for acidification. If other chemical operations are conducted adjacent, either sulfuric or hydrochloric acid in an adequately pure form may be present as a by-product waste stream and, hence, chargeable at a very low cost. The required sodium carbonate may at least in part be produced by absorbing carbon dioxide from stack gases with caustic soda.

The treatment such as the calcium carbonate settling and ion exchange steps may be at an elevated temperature as at higher temperature reactions occur more rapidly, and the viscosity of the solution is reduced so that it is more easily handled. At the same time as the effluent is to be treated in a physical conversion unit, if a physical conversion process is chosen which involves evaporation, the heat used to warm the sea water is recovered. Useful data on presoftening and ion exchange is given in U.S. Patent 2,772,143, supra.

The precipitated calcium carbonate is in a comparatively pure form, which is easily handled and, as such, may be more valuable in this form than as the burned and recycled lime.

*Example 2*

This process descales water at a high concentration ratio and offers considerable flexibility in by-products. Magnesia and chlorine are necessarily produced. Purified sodium chloride, sodium hydroxide, chlorine and bromine are produced in a desired amount up to the maximum values in the feed water.

Figure 2:
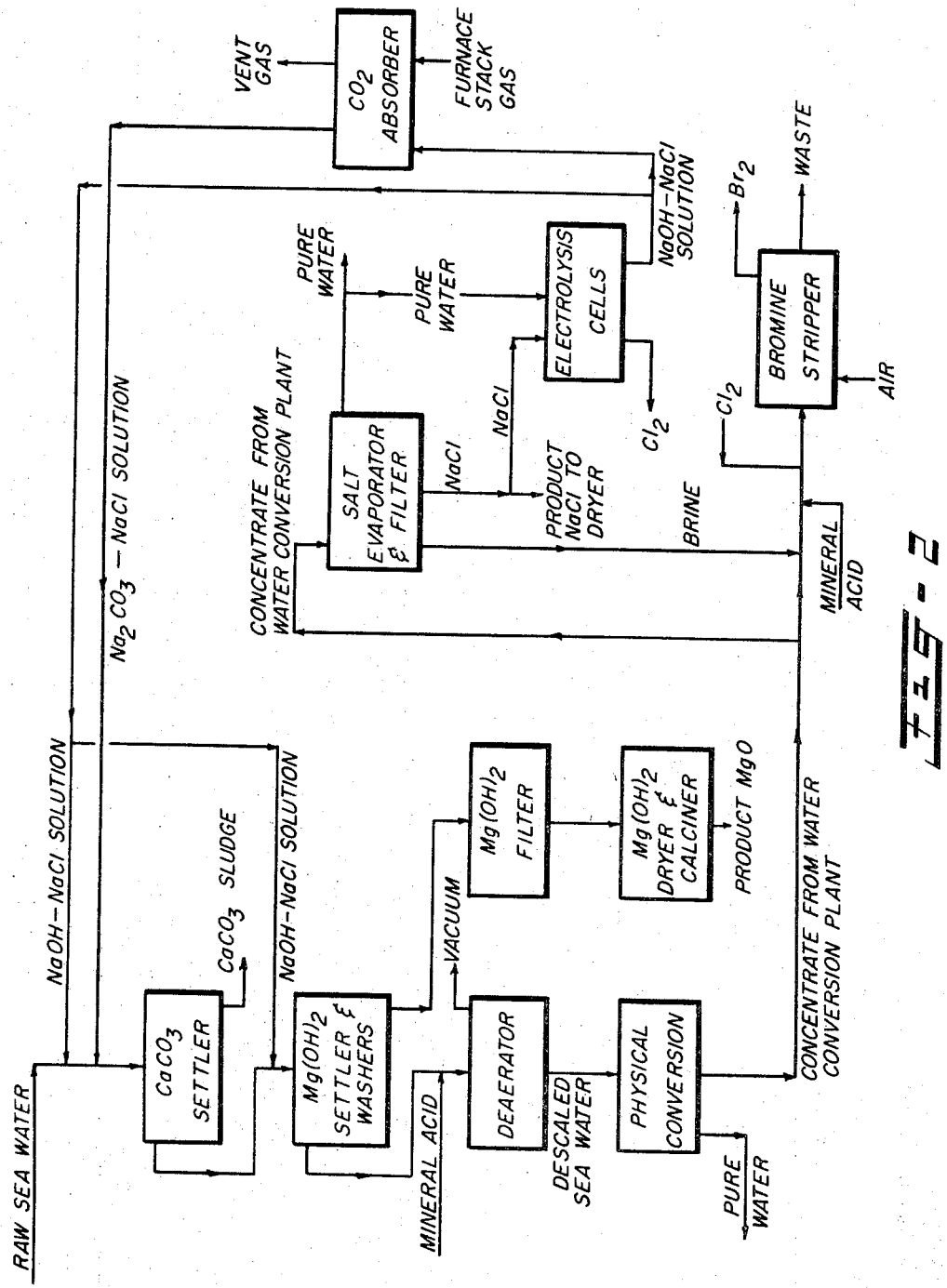
FIGURE 2 is a flow sheet of an embodiment separating magnesium as the hydroxide, and salt recovered as such.

As shown in FIGURE 2, the sea water is treated with recycled sodium hydroxide solution containing some sodium chloride from an electrolysis cell and sodium carbonate containing some sodium chloride from absorbing carbon dioxide from stack gas in the same caustic salt solution. Settling may be aided by the addition of small quantities, of the order of 1 to 2 parts per million, of a high molecular weight polyacrylamide and the calcium carbonate settled out as a sludge. The decalcified sea water is then mixed with additional sodium hydroxide solution which precipitates the magnesium as a hydroxide. Additional polyacrylamide may be added to aid in the settling of the magnesium hydroxide. The magnesium hydroxide is washed, filtered, dried, and may be calcined to yield purified magnesium oxide or treated with hydrochloric acid to yield magnesium chloride. The clear effluent from the magnesium hydroxide precipitate is acidified with sulfuric acid, deaerated, then fed to the physical conversion step. A compression distillation stage was used to give pure water as product, and a concentrate nearly saturated in sodium chloride. Whereas the concentrate could be treated as in Example 1, by choice it was fed into a salt evaporator with pure water being collected in the overhead and evaporation being continued forming pure product sodium chloride, until the incipient precipitation of other salts. At this point the residual brine was mixed with a mineral acid and chlorine gas for the recovery of bromine as described in Example 1. After the stripping of the bromine the residual brine was discharged back into the sea. Part of the product sodium chloride was mixed with fresh water and fed to electrolysis cells to generate saleable chlorine gas, and sodium hydroxide solution, containing some residual sodium chloride, which was recycled to the process.

The proportion which is electrolyzed depends on the demand for chlorine and caustic at the plant location.

It is not necessary to remove sulfates from the concentrate to the salt evaporator unless a high salt product rate is desired. If high salt production is desired, it is convenient to remove the sulfates as described in Example 1.

The waste brine from the bromine stripper is preferably neutralized with sodium carbonate or lime to reduce damage to aquatic life from the effluent. The process of this example is particularly attractive because the output of chlorine from a ten million gallon per day conversion plant would amount to less than 3% of the commercially shipped chlorine in the United States and, hence, could be readily absorbed by the market.

*Example 3*

Figure 3:
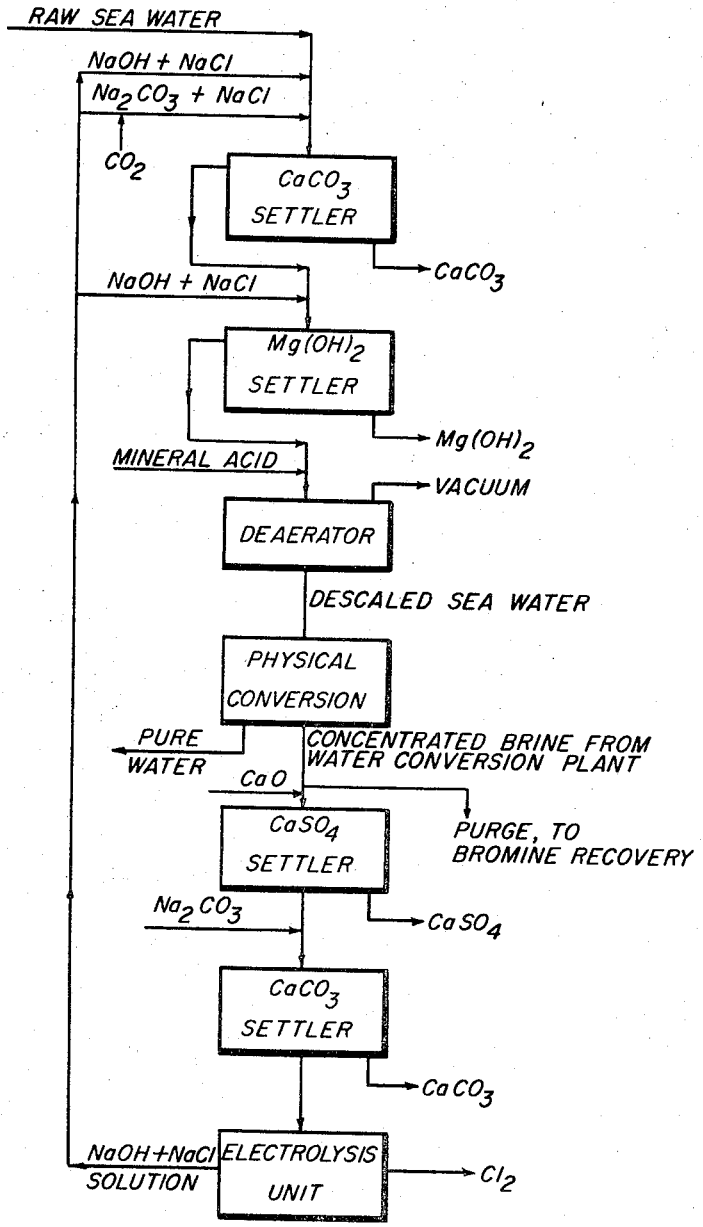
FIG. 3 is a flow sheet showing magnesium separated as the hydroxide, and direct electrolytic regeneration of sodium hydroxide.

As shown in FIGURE 3, the raw sea water is treated with sodium hydroxide containing sodium chloride and sodium carbonate containing sodium chloride recycled from electrolysis cells, and stack gas absorption. Calcium carbonate is separated out, and magnesium hydroxide is precipitated by the addition of additional caustic. The descaled sea water is fed through a deaerator after being mixed with mineral acid and the descaled, acidified sea water is physically converted by a multiple-effect multiple-stage conversion distillation unit to yield pure water and a concentrated brine. Part of this brine is purged to bromine recovery as above described, which purge removes recycled products other than the desired products. The remainder of the concentrate has lime added thereto in sufficient quantity to separate the sulfates as calcium sulfate, which is recovered in the form of gypsum and then sodium carbonate is added in sufficient quantity to precipitate substantially all of the remaining calcium as calcium carbonate, which gives a concentrated sodium chloride solution which is fed to the electrolysis units. In this process the calcium carbonate can be burned to lime and the stack gases used as a source of carbon dioxide in the production of sodium carbonate.

As is obvious to those skilled in the art, the processes described in these three examples may be in part interchanged with each other and the products can be separated out in the form which is acceptable to the market. For example, part of the sodium chloride can be sold as a brine where such brine is desired, and the cost of shipment is reasonable. The effluent from the bromine recovery contains the majority of trace minerals not otherwise accounted for. Suitable steps can be taken for their recovery if desired. Usually the material is not of sufficient value to warrant further treatment.

Other changes and modifications obvious to those skilled in the art are within the scope of the appended claims.

We claim:

1. The method of recovering potable water from sea water which comprises adding in any order to sea water (1) a soluble alkaline material to convert substantially all of the bicarbonate to carbonate, and (2) sodium carbonate to react with substantially all of the calcium, and separating out the resultant precipitated calcium carbonate, together with coprecipitated iron and aluminum as hydroxides; subsequently separately separating magnesium ions from the decalcified sea water, thus forming a descaled sea water, adding a low cost mineral acid, separating the descaled sea water into a potable water product, and a saline concentrate, and recovering at least part of the sodium values in the sodium chloride in the saline concentrate in a form useful for recycling to the process, as at least one of (1) said soluble alkaline material and (2) said sodium carbonate.

2. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides; and subsequently separately adding additional sodium hydroxide and separating magnesium from the decalcified sea water, as the hydroxide, thus forming a descaled sea water, adding a low cost mineral acid to the thus descaled sea water, evaporating and condensing part of the descaled sea water containing said mineral acid to form a potable water product and a residual saline concentrate, and recovering and recycling at least part of the sodium values in the saline concentrate as sodium hydroxide for pH adjustment.

3. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides; and subsequently separately separating magnesium ions from the decalcified sea water, with a cation exchange resin, thus forming a descaled sea water, adding a low cost mineral acid to the thus descaled sea water, evaporating and condensing part of the descaled sea water containing said mineral acid to form a potable water product and a residual saline concentrate, and recovering and recycling at least part of the sodium values in the saline concentrate as sodium chloride solution to regenerate said cation exchange resin.

4. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides; and subsequently separately adding additional sodium hydroxide and separating magnesium from the decalcified sea water, as the hydroxide, thus forming a descaled sea water, adding a low cost mineral acid to the thus descaled sea water, physically converting the descaled sea water containing said mineral acid to a potable water product and a saline concentrate by freezing, and recovering and recycling at least part of the sodium values in the saline concentrate as sodium hydroxide for pH adjustment.

5. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides; and subsequently separately separating magnesium ions from the decalcified sea water, with a cation exchange resin, thus forming a descaled sea water, adding a low cost mineral acid to the thus descaled sea water, physically converting the descaled sea water containing said mineral acid to a potable water product and a saline concentrate by freezing, and recovering and recycling at least part of the sodium values in the saline concentrate as sodium chloride solution to regenerate said cation exchange resin.

6. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides, and subsequently separately adding additional sodium hydroxide and separating magnesium from the decalcified sea water, as the hydroxide, thus forming a descaled sea water, adding a low cost mineral acid to the thus descaled sea water, physically converting the descaled sea water containing said mineral acid to a potable water product and a saline concentrate by electrodialysis, and recovering and recycling at least part of the sodium values in the saline concentrate as sodium hydroxide for pH adjustment.

7. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides; and subsequently separately separating magnesium ions from the decalcified sea water, with a cation exchange resin, thus forming a descaled sea water, adding a low cost mineral acid to the thus descaled sea water, physically converting the descaled sea water containing said mineral acid to a potable water product and a saline concentrate by electrodialysis, and recovering and recycling at least part of the sodium values in the saline concentrate as sodium chloride solution to regenerate said cation exchange resin.

8. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides, and subsequently separately adding additional sodium hydroxide and separating magnesium from the decalcified sea water, as the hydroxide, thus forming a descaled sea water, adding a low cost mineral acid to the thus descaled sea water, physically converting the descaled sea water containing said mineral acid to a potable water product and a saline concentrate by reverse osmosis, and recovering and recycling at least part of the sodium values in the saline concentrate as sodium hydroxide for pH adjustment.

9. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react wih substantially all of the calcium, and separating out the resultant precipitated calcium carbonate, together with coprecipitated iron and aluminum as hydroxides; and subsequently separately separating magnesium ions from the decalcified sea water, with a cation exchange resin, thus forming a descaled sea water, adding a low cost mineral acid to the thus descaled sea water, physically converting the descaled sea water containing said mineral acid to a potable water product and a saline concentrate by reverse osmosis, and recovering and recycling at least part of the sodium values in the saline concentrate as sodium chloride solution to regenerate said cation exchange resin.

10. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides, and subsequently separately adding additional sodium hydroxide and separating magnesium from the decalcified sea water, as the hydroxide, thus forming a descaled sea water, adding a low cost mineral acid to the thus descaled sea water, physically converting the descaled sea water containing said mineral acid to a potable water product and a saline concentrate by hydrate formation, and recovering and recycling at least part of the sodium values in the saline concentrate as sodium hydroxide for pH adjustment.

11. The method of recovering potable water from sea water which comprises adding in any order to sea water (1) a soluble alkaline material from the group consisting of sodium hydroxide, calcium oxide and calcium hydroxide to convert substantially all of the bicarbonate to carbonate, and (2) sodium carbonate to react with substantially all of the calcium, and separating out the resultant precipitated calcium carbonate, together with coprecipitated iron and aluminum as hydroxides; and subsequently separately separating magnesium ions from the decalcified sea water, with a cation exchange resin, thus forming a descaled sea water, adding a low cost mineral acid to the thus descaled sea water, physically converting the descaled sea water containing said mineral acid to a potable water product and a saline concentrate by hydrate formation, and recovering and recycling at least part of the sodium values in the saline concentrate as sodium chloride solution to regenerate said cation exchange resin.

References Cited

UNITED STATES PATENTS

| Patent No. | Date | Inventor | Class |
|---|---|---|---|
| 2,342,062 | 2/1944 | Schenk | 202—205 |
| 2,934,419 | 4/1960 | Cook | 71—1 |
| 3,017,338 | 1/1962 | Butler et al. | 204—128 |
| 3,055,734 | 9/1962 | Pomykala | 23—201 |
| 3,075,828 | 1/1963 | Kato et al. | 23—201 |
| 3,128,248 | 4/1964 | Suzuki | 210—53 XR |
| 3,239,460 | 3/1966 | Popper | 210—24 |

JOSEPH SCOVRONEK, *Primary Examiner.*

MORRIS O. WOLK, *Examiner.*

E. G. WHITBY, *Assistant Examiner.*